US011955681B2

(12) United States Patent
Atsuchi et al.

(10) Patent No.: US 11,955,681 B2
(45) Date of Patent: Apr. 9, 2024

(54) BAND-PASS FILTER

(71) Applicant: TDK CORPORATION, Tokyo (JP)

(72) Inventors: Honoka Atsuchi, Tokyo (JP); Yuta Ashida, Tokyo (JP); Longfei Yi, Tokyo (JP); Yoshinori Matsumaru, Tokyo (JP); Shuhei Sawaguchi, Tokyo (JP); Masahiro Tatematsu, Tokyo (JP); Shigemitsu Tomaki, Tokyo (JP)

(73) Assignee: TDK CORPORATION, Tokyo (JP)

( * ) Notice: Subject to any disclaimer, the term of this patent is extended or adjusted under 35 U.S.C. 154(b) by 79 days.

(21) Appl. No.: 17/556,559

(22) Filed: Dec. 20, 2021

(65) Prior Publication Data

US 2022/0209380 A1 Jun. 30, 2022

(30) Foreign Application Priority Data

Dec. 24, 2020 (JP) ................................ 2020-215674

(51) Int. Cl.
*H01P 1/20* (2006.01)

(52) U.S. Cl.
CPC ..................................... *H01P 1/20* (2013.01)

(58) Field of Classification Search
CPC ...... H01P 1/20; H01P 1/20372; H01P 1/2002; H01P 7/08
See application file for complete search history.

(56) References Cited

U.S. PATENT DOCUMENTS 5,055,809 A * 10/1991 Sagawa ............... H01P 1/20336 333/204
6,313,719 B1 * 11/2001 Barnett ............... H01P 1/20372 333/204
2005/0088258 A1 * 4/2005 Fischer ............... H01P 1/20381 333/204
2014/0232482 A1 8/2014 Wada et al.
2020/0106148 A1 4/2020 Ashida et al.

FOREIGN PATENT DOCUMENTS

CN 102255123 A 11/2011
JP H10-209708 A 8/1998
JP 2004-266696 A 9/2004

OTHER PUBLICATIONS

A. Zakharov, S. Rozenko, S. Litvintsev and M. Ilchenko, "Hairpin Resonators in Varactor-Tuned Microstrip Bandpass Filters," in IEEE Transactions on Circuits and Systems II: Express Briefs, vol. 67, No. 10, pp. 1874-1878, Oct. 2020, doi: 10.1109/TCSII.2019.2953247. (Year: 2020).*

* cited by examiner

*Primary Examiner* — Andrea Lindgren Baltzell
*Assistant Examiner* — Kimberly E Glenn
(74) *Attorney, Agent, or Firm* — Oliff PLC

(57) ABSTRACT

A band-pass filter includes a first input/output port, a second input/output port, a plurality of resonators, and a multilayer stack. The multilayer stack includes a plurality of stacked dielectric layers. Each of the resonators is an open-ended resonator formed of a conductor line in the multilayer stack. Each of the resonators includes a resonator conductor portion including a first line part and a second line part located away from each other in a direction orthogonal to a stacking direction of the plurality of dielectric layers, and a third line part connecting the first line part and the second line part. The first to third line parts extend to surround a space between the first line part and the second line part.

8 Claims, 13 Drawing Sheets

BAND-PASS FILTER

BACKGROUND OF THE INVENTION

1. Field of the Invention

The present invention relates to a band-pass filter including a plurality of resonators.

2. Description of the Related Art

Communication services using the fifth generation mobile communication system (hereinafter, referred to as 5G) are currently starting to be provided. In 5G, 10-GHz and higher frequency bands, or especially 10- to 30-GHz quasi-millimeter wavebands and 30- to 300-GHz millimeter wavebands, are assumed to be used.

One of electronic components used in a communication apparatus is a band-pass filter including a plurality of resonators. Each of the plurality of resonators includes, for example, a conductor portion that is long in one direction. Miniaturization of band-pass filters used in small-sized communication apparatuses, in particular, has been desired.

JP H10-209708 A discloses a band-pass filter including two U-shaped stripline resonators that are each grounded at one end and open at the other end. The U-shaped stripline resonators are arranged with their grounded ends adjacent to each other. JP 2004-266696 A discloses a band-pass filter including two U-shaped resonator electrodes that are each open at one end and short-circuited at the other end. The resonator electrodes are arranged with their open ends adjacent to each other. The band-pass filters disclosed in JP H10-209708 A and JP 2004-266696 A are miniaturized by bending the conductors forming the resonators.

US 2020/0106148 A1 discloses a band-pass filter that includes a straight-shaped resonator having a resonator conductor portion including a narrow portion and two wide portions located on both sides of the narrow portion. The resonator having such a configuration is a kind of stepped impedance resonator (hereinafter referred to as SIR). The resonator according to US 2020/0106148 A1 is an open-ended half-wavelength resonator.

A band-pass filter including a plurality of half-wavelength resonators has had the problem of being difficult to miniaturize because of the long half-wavelength resonators. In US 2020/0106148 A1, the band-pass filter is miniaturized by using SIRs to reduce the length of the resonator conductor portions. However, this band-pass filter has had room for improvement in terms of miniaturization.

SUMMARY OF THE INVENTION

An object of the present invention is to provide a band-pass filter that includes a plurality of open-ended resonators and can be miniaturized.

A band-pass filter according to the present invention includes a first input/output port, a second input/output port, a plurality of resonators that are provided between the first input/output port and the second input/output port in circuit configuration and are configured so that two resonators adjacent to each other in circuit configuration are electromagnetically coupled to each other, and a multilayer stack configured to integrate the first input/output port, the second input/output port, and the plurality of resonators. The multilayer stack includes a plurality of stacked dielectric layers.

Each of the resonators is an open-ended resonator formed of a conductor line in the multilayer stack. At least one of the resonators includes a resonator conductor portion including a first line part and a second line part located away from each other in a direction orthogonal to a stacking direction of the plurality of dielectric layers, and a third line part connecting the first line part and the second line part. The first to third line parts extend to surround a space between the first line part and the second line part.

In the band-pass filter according to the present invention, the plurality of resonators may include a first resonator closest to the first input/output port in circuit configuration, a second resonator closest to the second input/output port in circuit configuration, and at least one intermediate resonator provided between the first resonator and the second resonator in circuit configuration. In such a case, the first and second resonators may each include the resonator conductor portion. The third line part of the resonator conductor portion of the first resonator and the third line part of the resonator conductor portion of the second resonator may be adjacent to each other and both extend in the same direction orthogonal to the stacking direction.

If the plurality of resonators includes at least one intermediate resonator, then the at least one intermediate resonator may include a plurality of intermediate resonators. In such a case, at least one of the plurality of intermediate resonators may include the resonator conductor portion. Alternatively, that at least one intermediate resonator may include a third resonator, a fourth resonator, and a fifth resonator. The fourth resonator is provided between the third resonator and the fifth resonator in circuit configuration. In such a case, the third and fifth resonators may each include the resonator conductor portion.

The band-pass filter according to the present invention may further include at least one capacitor. In such a case, each of the first and second line parts may have an end located farthest from the third line part in a longitudinal direction of the resonator conductor portion. That at least one capacitor may be connected to the resonator conductor portion at a position away from the end towards the third line part in the longitudinal direction.

In the band-pass filter according to the present invention, the first line part may include a first constant-width portion having a constant lateral dimension, and the second line part may include a second constant-width portion having a constant lateral dimension. In such a case, the third line part may have a lateral dimension smaller than a lateral dimension of each of the first and second constant-width portions.

In the band-pass filter according to the present invention, at least one of the resonators includes the resonator conductor portion including the first line part and the second line part located away from each other in a direction orthogonal to the stacking direction of the plurality of dielectric layers, and the third line part connecting the first line part and the second line part. The first to third line parts extend to surround the space between the first line part and the second line part. The band-pass filter according to the present invention can thus be miniaturized.

Other and further objects, features and advantages of the present invention will appear more fully from the following description.

DETAILED DESCRIPTION OF THE PREFERRED EMBODIMENTS

First Embodiment

Figure 1:
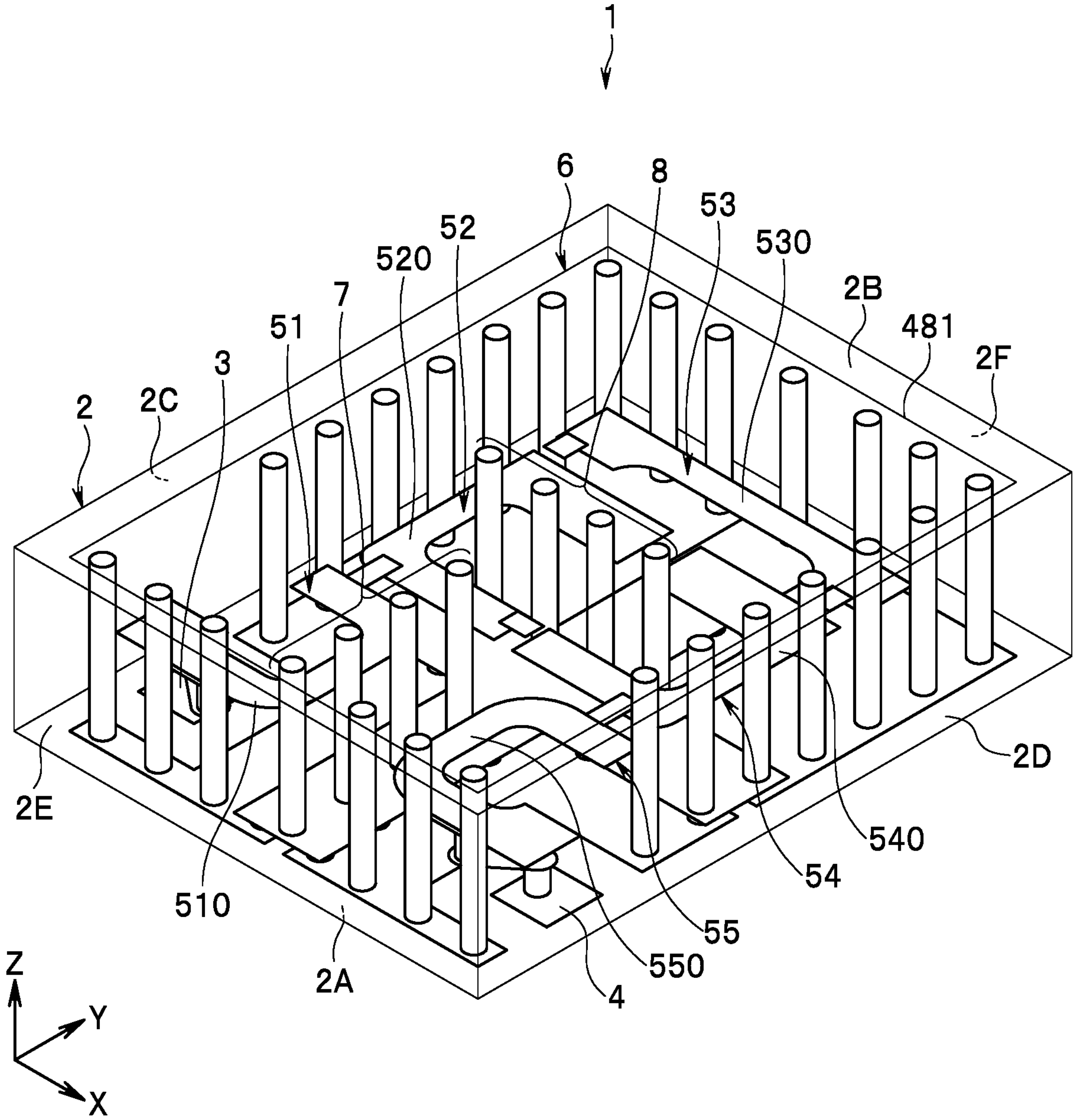
FIG. 1 is a perspective view showing the structure of a band-pass filter according to a first embodiment of the invention.
Figure 2:
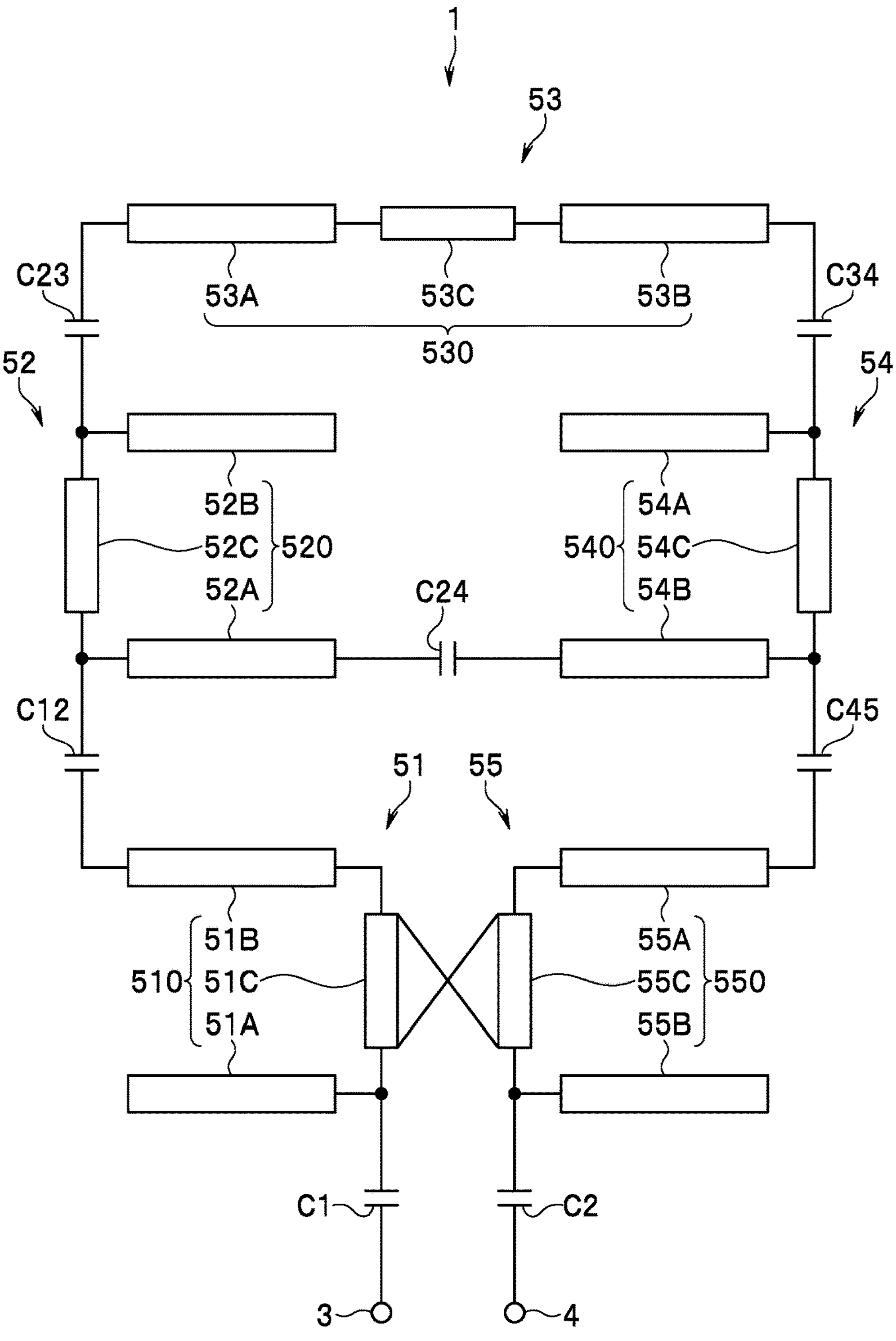
FIG. 2 is a circuit diagram showing the circuit configuration of the band-pass filter according to the first embodiment of the invention.

Preferred embodiments of the present invention will now be described in detail with reference to the drawings. First, reference is made to FIG. 1 and FIG. 2 to describe the configuration of a band-pass filter according to a first embodiment of the invention. FIG. 1 is a perspective view showing the structure of the band-pass filter according to the present embodiment. FIG. 2 is a circuit diagram showing the circuit configuration of the band-pass filter according to the present embodiment.

As shown in FIGS. 1 and 2, a band-pass filter 1 according to the present embodiment includes a first input/output port 3, a second input/output port 4, a plurality of resonators, and a multilayer stack 2. The plurality of resonators are configured so that two resonators adjacent to each other in circuit configuration are to be electromagnetically coupled to each other. The multilayer stack 2 is intended to integrate the first input/output port 3, the second input/output port 4, and the plurality of resonators. The multilayer stack 2 includes a plurality of stacked dielectric layers. Each of the resonators is an open-ended, half-wavelength resonator formed of a conductor line in the multilayer stack 2. As used herein, the phrase □ in circuit configuration □ is to describe layout in a circuit diagram, not in a physical configuration.

Here, X, Y, and Z directions are defined as shown in FIG. 1. The X, Y, and Z directions are orthogonal to one another. In the present embodiment, the direction in which the plurality of dielectric layers are stacked is the Z direction (the upward direction in FIG. 1). The opposite directions to the X, Y, and Z directions will be referred to as −X, −Y, and −Z directions, respectively.

The multilayer stack 2 is shaped like a rectangular solid. The multilayer stack 2 has a bottom surface 2A and a top surface 2B located at opposite ends in the Z direction of the multilayer stack 2, and further has four side surfaces 2C, 2D, 2E and 2F connecting the bottom surface 2A and the top surface 2B. The bottom surface 2A is located at the end of the multilayer stack 2 in the −Z direction. The top surface 2B is located at the end of the multilayer stack 2 in the Z direction. The side surface 2C is located at the end of the multilayer stack 2 in the −X direction. The side surface 2D is located at the end of the multilayer stack 2 in the X direction. The side surface 2E is located at the end of the multilayer stack 2 in the −Y direction. The side surface 2F is located at the end of the multilayer stack 2 in the Y direction.

The plurality of resonators are provided between the first input/output port 3 and the second input/output port 4 in circuit configuration. As shown in FIG. 2, in the present embodiment, the plurality of resonators are five resonators 51, 52, 53, 54, and 55 in particular. The five resonators 51, 52, 53, 54, and 55 are arranged in this order from the first input/output port 3 side in circuit configuration. The resonator 51 is the closest to the first input/output port 3 in circuit configuration. The resonator 55 is the closest to the second input/output port 4 in circuit configuration. The resonator 51 corresponds to a "first resonator" of the present invention. The resonator 55 corresponds to a "second resonator" of the present invention.

The resonators 52 to 54 are provided between the resonators 51 and 55 in circuit configuration. The resonators 52 to 54 correspond to "intermediate resonators" of the present invention. The resonator 53 is provided between the resonators 52 and 54 in circuit configuration. The resonator 52 corresponds to a "third resonator" of the present invention. The resonator 53 corresponds to a "fourth resonator" of the present invention. The resonator 54 corresponds to a "fifth resonator" of the present invention.

The resonators 51 to 55 are configured so that the resonators 51 and 52 are adjacent to each other in circuit configuration and are electromagnetically coupled to each other, the resonators 52 and 53 are adjacent to each other in circuit configuration and are electromagnetically coupled to each other, the resonators 53 and 54 are adjacent to each other in circuit configuration and are electromagnetically coupled to each other, and the resonators 54 and 55 are adjacent to each other in circuit configuration and are electromagnetically coupled to each other. In the present embodiment, the electromagnetic coupling between every two of the resonators adjacent to each other in circuit configuration is specifically capacitive coupling.

The band-pass filter 1 includes a capacitor C12 for establishing capacitive coupling between the resonators 51 and 52, a capacitor C23 for establishing capacitive coupling between the resonators 52 and 53, a capacitor C34 for establishing capacitive coupling between the resonators 53 and 54, and a capacitor C45 for establishing capacitive coupling between the resonators 54 and 55.

In a band-pass filter including three or more resonators configured so that every two of the resonators adjacent to each other in circuit configuration are coupled to each other, electromagnetic coupling may be established between two resonators that are not adjacent to each other in circuit configuration. Such electromagnetic coupling between non-adjacent resonators will be referred to as cross coupling. As will be described in detail below, the band-pass filter 1 according to the present embodiment has two cross couplings.

In the present embodiment, among the five resonators 51 to 55, the resonator 51, which is the closest to the first input/output port 3 in circuit configuration, and the resonator 55, which is the closest to the second input/output port 4 in circuit configuration, are magnetically coupled to each other although they are not adjacent to each other in circuit configuration.

Further, in the present embodiment, among the five resonators 51 to 55, the resonator 52, which is the second closest to the first input/output port 3 in circuit configuration, and the resonator 54, which is the second closest to the second input/output port 4 in circuit configuration, are capacitively coupled to each other although they are not adjacent to each other in circuit configuration. The band-pass filter 1 further includes a capacitor C24 for establishing capacitive coupling between the resonators 52 and 54.

The band-pass filter 1 further includes a capacitor C1 provided between the first input/output port 3 and the resonator 51, and a capacitor C2 provided between the second input/output port 4 and the resonator 55.

The band-pass filter 1 further includes a shield 6, a first partition 7, and a second partition 8. The shield 6 is formed of a conductor and integrated with the multilayer stack 2. The shield 6 is connected to the ground. The shield 6 has the function of preventing electromagnetic radiation to the surroundings of the band-pass filter 1. The shield 6 is arranged to surround the five resonators. Each of the first partition 7 and the second partition 8 is formed of a conductor, provided within the multilayer stack 2 and electrically connected to the shield 6.

The first partition 7 extends in the Z direction. The first partition 7 runs through two or more dielectric layers constituting the multilayer stack 2. The first partition 7 has a function of suppressing a TE mode. In the present embodiment, the first partition 7 includes a plurality of first through hole lines each running through the two or more dielectric layers constituting the multilayer stack 2. In FIG. 1, each first through hole lines is represented by a circular column. Each of the first through hole lines includes two or more through holes connected in series. Each of the first through hole lines extends in the Z direction. The first through hole lines are arranged to be adjacent to each other in the Y direction. In the present embodiment, the number of the first through hole lines is four.

The second partition 8 extends in the Z direction. The second partition 8 runs through the two or more dielectric layers constituting the multilayer stack 2. In the present embodiment, the second partition 8 includes a plurality of second through hole lines each running through the two or more dielectric layers constituting the multilayer stack 2. In FIG. 1, each second through hole lines is represented by a circular column. Each of the second through hole lines includes two or more through holes connected in series. Each of the second through hole lines extends in the Z direction. The second through hole lines are arranged to be adjacent to each other in the X direction. In the present embodiment, the number of the second through hole lines is four.

Next, the configuration of the resonators 51 to 55 will be described in detail with reference to FIGS. 1 and 2. The resonators 51, 52, 53, 54, and 55 include resonator conductor portions 510, 520, 530, 540, and 550, respectively. The resonator conductor portions 510, 520, 530, 540, and 550 each extend in a direction orthogonal to the stacking direction of the plurality of dielectric layers, i.e., the Z direction.

As described above, each of the resonators 51 to 55 is an open-ended resonator. Each of the resonator conductor portions 510, 520, 530, 540, and 550 is thus open at both ends. Each of the resonator conductor portions 510, 520, 530, 540, and 550 has a length of one half or nearly one half the wavelength corresponding to the center frequency of the passband of the band-pass filter 1.

Each of the resonator conductor portions 510, 520, 530, 540, and 550 includes a first line part and a second line part located away from each other in a direction orthogonal to the Z direction, and a third line part connecting the first and second line parts.

The first, second, and third line parts of the resonator conductor portion 510 will hereinafter be denoted by reference numerals 51A, 51B, and 51C, respectively. The first, second, and third line parts of the resonator conductor portion 520 will be denoted by reference numerals 52A, 52B, and 52C, respectively. The first, second, and third line parts of the resonator conductor portion 530 will be denoted by reference numerals 53A, 53B, and 53C, respectively. The first, second, and third line parts of the resonator conductor portion 540 will be denoted by reference numerals 54A, 54B, and 54C, respectively. The first, second, and third line parts of the resonator conductor portion 550 will be denoted by reference numerals 55A, 55B, and 55C, respectively.

Reference is now made to FIG. 3 to FIG. 12 to describe an example of the dielectric layers constituting the multilayer stack 2 and the configuration of a plurality of conductor layers formed on the dielectric layers and a plurality of through holes formed in the dielectric layers. In this example, the multilayer stack 2 includes eighteen dielectric layers stacked together. The eighteen dielectric layers will be referred to as the first to eighteenth dielectric layers in the order from bottom to top. The first to eighteenth dielectric layers are denoted by reference numerals 31 to 48, respectively. In FIG. 3 to FIG. 11, each circle represents a through hole.

Figure 3:
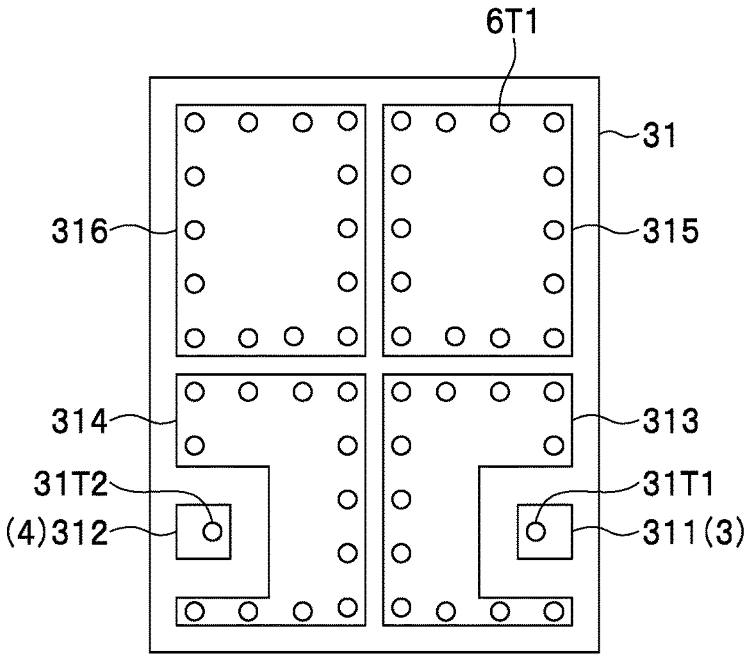
FIG. 3 is an explanatory diagram showing a patterned surface of a first dielectric layer of a multilayer stack shown in FIG. 1.

FIG. 3 shows a patterned surface of the first dielectric layer 31. On the patterned surface of the first dielectric layer 31, there are formed a conductor layer 311 forming the first input/output port 3, a conductor layer 312 forming the second input/output port 4, and conductor layers 313, 314, 315, and 316 forming the shield 6.

In the dielectric layer 31, there are also formed a through hole 31T1 connected to the conductor layer 311, a through hole 31T2 connected to the conductor layer 312, and a plurality of through holes 6T1 forming the shield 6. In FIG. 3, one of the through holes 6T1 is represented by a circle denoted by the reference numeral 6T1. The other through holes 6T1 are represented by a plurality of circles without a reference numeral. In diagrams similar to FIG. 3 that are used in the following description, the plurality of through holes forming the shield 6 is expressed in the same manner as in FIG. 3. Each of the through holes 6T1 is connected to any one of the conductor layers 313 to 316.

Figure 4:
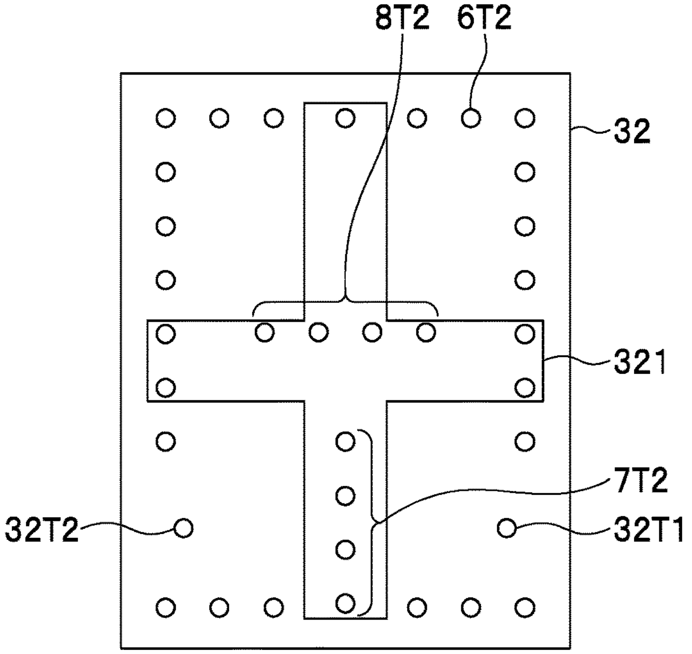
FIG. 4 is an explanatory diagram showing a patterned surface of a second dielectric layer of the multilayer stack shown in FIG. 1.

FIG. 4 shows a patterned surface of the second dielectric layer 32. On the patterned surface of the first dielectric layer 32, there are formed a conductor layer 321 forming the shield 6.

In the dielectric layer 32, there are formed through holes 32T1 and 32T2. The through holes 31T1 and 31T2 shown in FIG. 3 are connected to the through holes 32T1 and 32T2, respectively.

Further formed in the dielectric layer 32 are a plurality of through holes 6T2 forming the shield 6, four through holes 7T2 forming the first partition 7, and four through holes 8T2 forming the second partition 8. Some of the plurality of through holes 6T2, the four through holes 7T2, the four through holes 8T2, and some of the through holes 6T1 shown in FIG. 3 are connected to the conductor layer 321. A plurality of through holes not connected to the conductor layer 321 among the plurality of through holes 6T2 are connected to a plurality of through holes not connected to the conductor layer 321 among the plurality of through holes 6T1.

Figure 5:
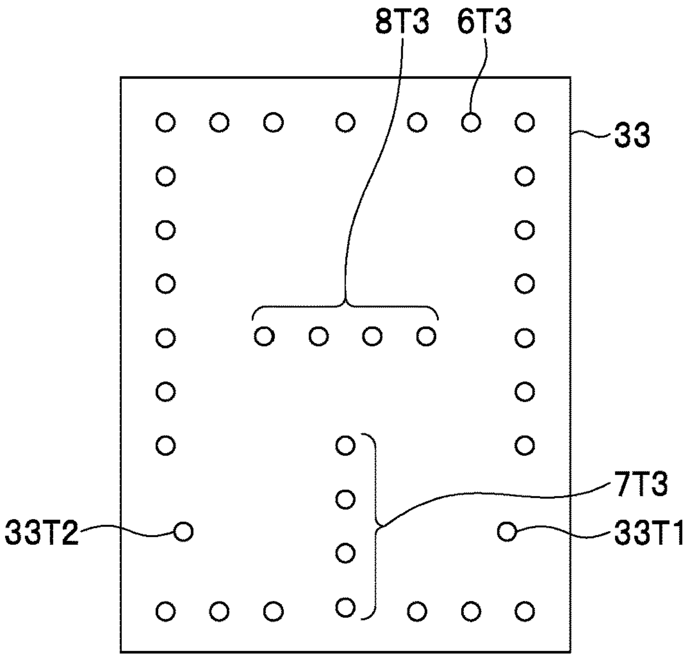
FIG. 5 is an explanatory diagram showing a patterned surface of a third dielectric layer of the multilayer stack shown in FIG. 1.

FIG. 5 shows a patterned surface of the third dielectric layer 33. Through holes 33T1 and 33T2 are formed in the dielectric layer 33. The through holes 32T1 and 32T2 shown in FIG. 4 are connected to the through holes 33T1 and 33T2, respectively.

Further formed in the dielectric layer 33 are a plurality of through holes 6T3 forming the shield 6, four through holes 7T3 forming the first partition 7, and four through holes 8T3 forming the second partition 8. The plurality of through holes 6T2 shown in FIG. 4 are connected to the plurality of through holes 6T3, respectively. The four through holes 7T2 shown in FIG. 4 are connected to the four through holes 7T3, respectively. The four through holes 8T2 shown in FIG. 4 are connected to the four through holes 8T3, respectively.

Figure 6:
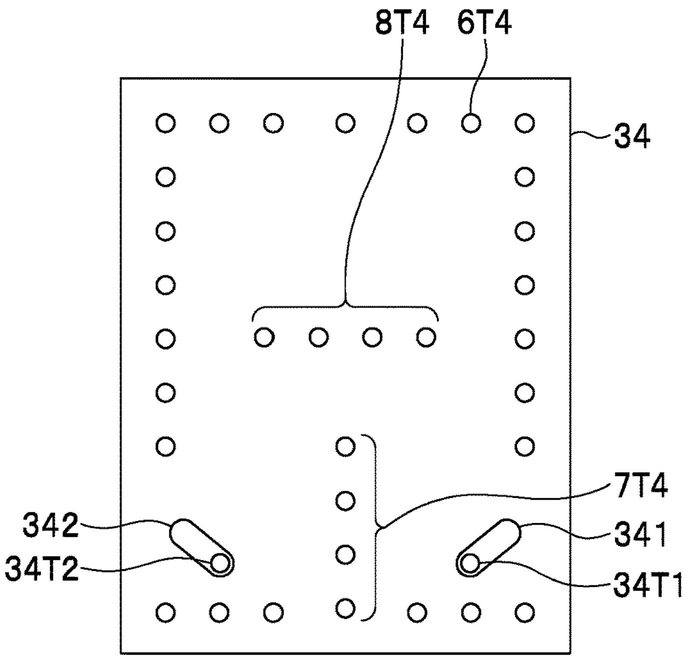
FIG. 6 is an explanatory diagram showing a patterned surface of a fourth dielectric layer of the multilayer stack shown in FIG. 1.

FIG. 6 shows a patterned surface of the fourth dielectric layer 34. On the patterned surface of the dielectric layer 34, there are formed two conductor layers 341 and 342. The through hole 33T1 shown in FIG. 5 is connected to the conductor layer 341. The through hole 33T2 shown in FIG. 5 is connected to the conductor layer 342.

Further formed in the dielectric layer 34 are a through hole 34T1 connected to the conductor layer 341, and a through hole 34T2 connected to the conductor layer 342.

Further formed in the dielectric layer 34 are a plurality of through holes 6T4 forming the shield 6, four through holes 7T4 forming the first partition 7, and four through holes 8T4 forming the second partition 8. The plurality of through holes 6T3 shown in FIG. 5 are connected to the plurality of through holes 6T4, respectively. The four through holes 7T3 shown in FIG. 5 are connected to the four through holes 7T4, respectively. The four through holes 8T3 shown in FIG. 5 are connected to the four through holes 8T4, respectively.

Figure 7:
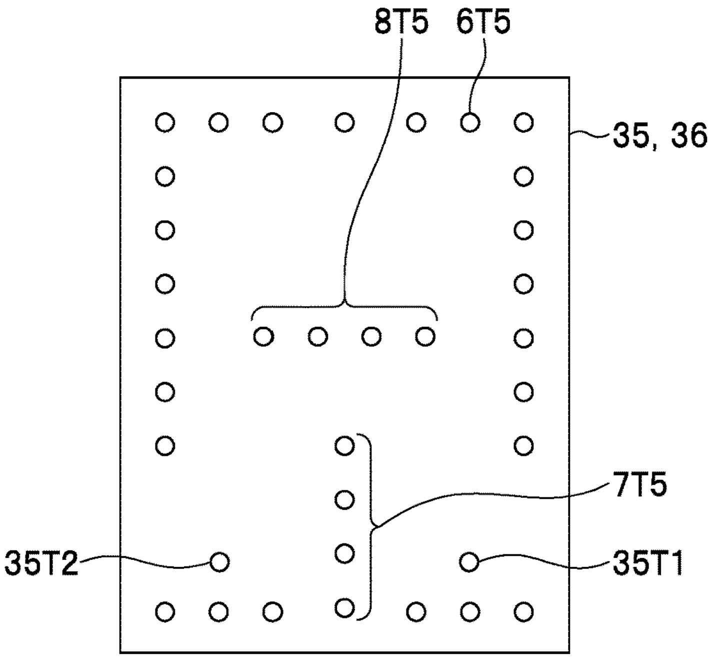
FIG. 7 is an explanatory diagram showing a patterned surface of each of a fifth and a sixth dielectric layer of the multilayer stack shown in FIG. 1.

FIG. 7 shows a patterned surface of each of the fifth and sixth dielectric layers 35 and 36. Through holes 35T1 and 35T2 are formed in each of the dielectric layers 35 and 36. The through holes 34T1 and 34T2 shown in FIG. 6 are respectively connected to the through holes 35T1 and 35T2 formed in the fifth dielectric layer 35.

Further formed in each of the dielectric layers 35 and 36 are a plurality of through holes 6T5 forming the shield 6, four through holes 7T5 forming the first partition 7, and four through holes 8T5 forming the second partition 8. The plurality of through holes 6T4 shown in FIG. 6 are connected to the plurality of through holes 6T5 formed in the fifth dielectric layer 35, respectively. The four through holes 7T4 shown in FIG. 6 are connected to the four through holes 7T5 formed in the fifth dielectric layer 35, respectively. The four through holes 8T4 shown in FIG. 6 are connected to the four through holes 8T5 formed in the fifth dielectric layer 35, respectively.

In the dielectric layers 35 and 36, every vertically adjacent through holes denoted by the same reference signs are connected to each other.

Figure 8:
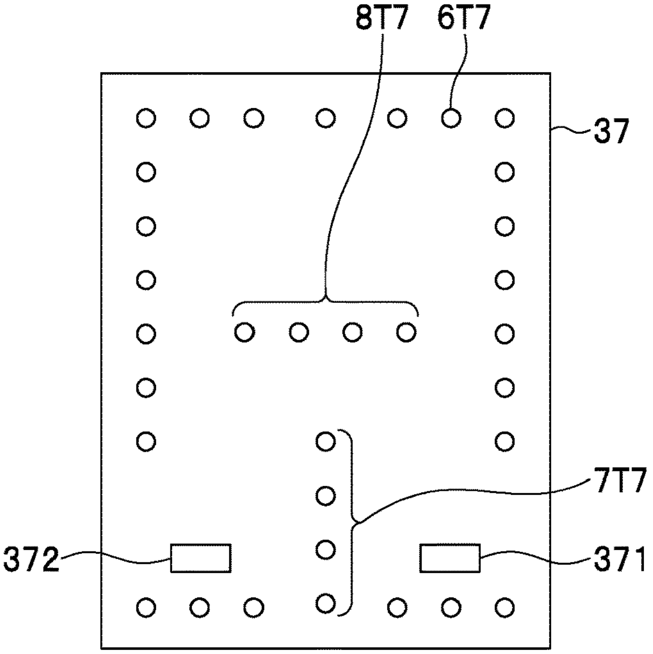
FIG. 8 is an explanatory diagram showing a patterned surface of a seventh dielectric layer of the multilayer stack shown in FIG. 1.

FIG. 8 shows a patterned surface of the seventh dielectric layer 37. On the patterned surface of the dielectric layer 37, there are formed a conductor layer 371 for forming the capacitor C1 shown in FIG. 2 and a conductor layer 372 for forming the capacitor C2 shown in FIG. 2. The through hole 35T1 formed in the sixth dielectric layer 36 is connected to the conductor layer 371. The through hole 35T2 formed in the sixth dielectric layer 36 is connected to the conductor layer 372.

Further formed in the dielectric layer 37 are a plurality of through holes 6T7 forming the shield 6, four through holes 7T7 forming the first partition 7, and four through holes 8T7 forming the second partition 8. The plurality of through holes 6T5 formed in the sixth dielectric layer 36 are connected to the plurality of through holes 6T7, respectively. The four through holes 7T5 formed in the sixth dielectric layer 36 are connected to the four through holes 7T7, respectively. The four through holes 8T5 formed in the sixth dielectric layer 36 are connected to the four through holes 8T7, respectively.

Figure 9:
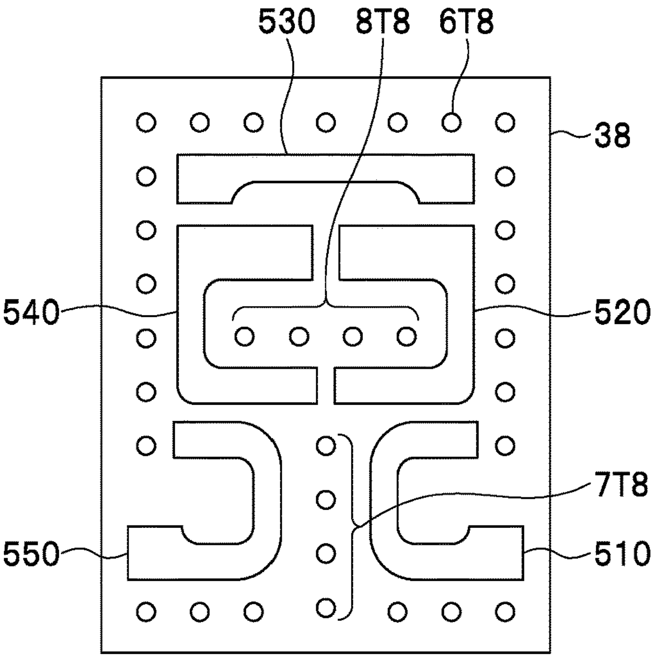
FIG. 9 is an explanatory diagram showing a patterned surface of an eighth dielectric layer of the multilayer stack shown in FIG. 1.

FIG. 9 shows a patterned surface of the eighth dielectric layer 38. The resonator conductor portions 510, 520, 530, 540, and 550 each formed of a conductor line are formed on the patterned surface of the dielectric layer 38. The shapes and layout of the resonator conductor portions 510, 520, 530, 540, and 550 will be described in detail below.

Further formed in the dielectric layer 38 are a plurality of through holes 6T8 forming the shield 6, four through holes 7T8 forming the first partition 7, and four through holes 8T8 forming the second partition 8. The plurality of through holes 6T8 are arranged around the resonator conductor portions 510, 520, 530, 540, and 550. The four through holes 7T8 are located between the resonator conductor portion 510 and the resonator conductor portion 550. The four through holes 8T8 are located in a space surrounded by the resonator conductor portions 520 and 540. The plurality of through holes 6T7 shown in FIG. 8 are connected to the plurality of through holes 6T8, respectively. The four through holes 7T7 shown in FIG. 8 are connected to the four through holes 7T8, respectively. The four through holes 8T7 shown in FIG. 8 are connected to the four through holes 8T8, respectively.

Figure 10:
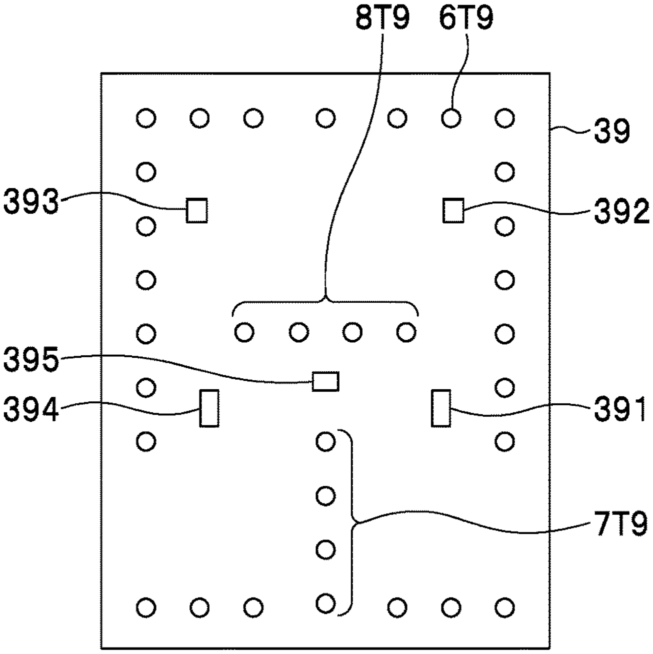
FIG. 10 is an explanatory diagram showing a patterned surface of a ninth dielectric layer of the multilayer stack shown in FIG. 1.

FIG. 10 shows a patterned surface of the ninth dielectric layer 39. On the patterned surface of the dielectric layer 39, there are formed conductor layers 391, 392, 393, 394, and 395 for forming the capacitors C12, C23, C34, C45, and C24 shown in FIG. 2, respectively.

Further formed in the dielectric layer 39 are a plurality of through holes 6T9 forming the shield 6, four through holes 7T9 forming the first partition 7, and four through holes 8T9 forming the second partition 8. The plurality of through holes 6T8 shown in FIG. 9 are connected to the plurality of through holes 6T9, respectively. The four through holes 7T8 shown in FIG. 9 are connected to the four through holes 7T9, respectively. The four through holes 8T8 shown in FIG. 9 are connected to the four through holes 8T9, respectively.

FIG. 10 shows a patterned surface of each of the tenth to seventeenth dielectric layers 40 to 47. In each of the dielectric layers 40 to 47, there are formed a plurality of through holes 6T10 forming the shield 6, four through holes 7T10 forming the first partition 7, and four through holes 8T10 forming the second partition 8. The plurality of through holes 6T9 shown in FIG. 10 are connected to the plurality of through holes 6T10 formed in the tenth dielectric layer 40, respectively. The four through holes 7T9 shown in FIG. 10 are connected to the four through holes 7T10 formed in the tenth dielectric layer 40, respectively. The four through holes 8T9 shown in FIG. 10 are connected to the four through holes 8T10 formed in the tenth dielectric layer 40, respectively.

In the dielectric layers 40 to 47, every vertically adjacent through holes denoted by the same reference signs are connected to each other.

Figure 11:
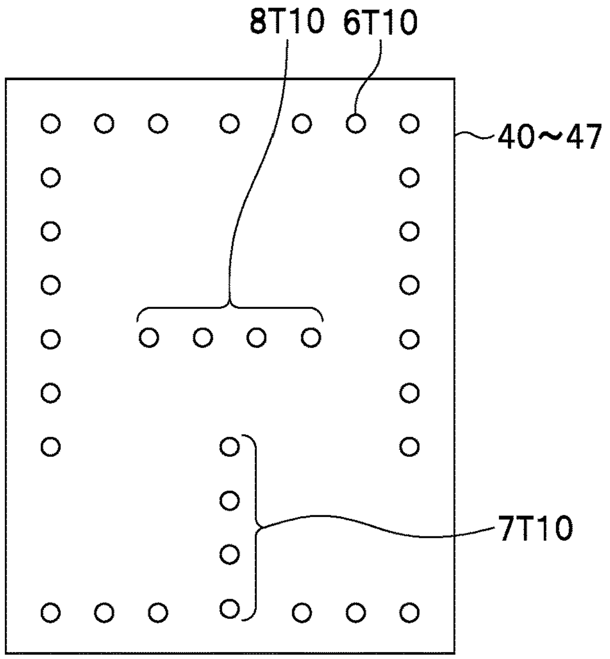
FIG. 11 is an explanatory diagram showing a patterned surface of each of a tenth to a seventeenth dielectric layer of the multilayer stack shown in FIG. 1.
Figure 12:
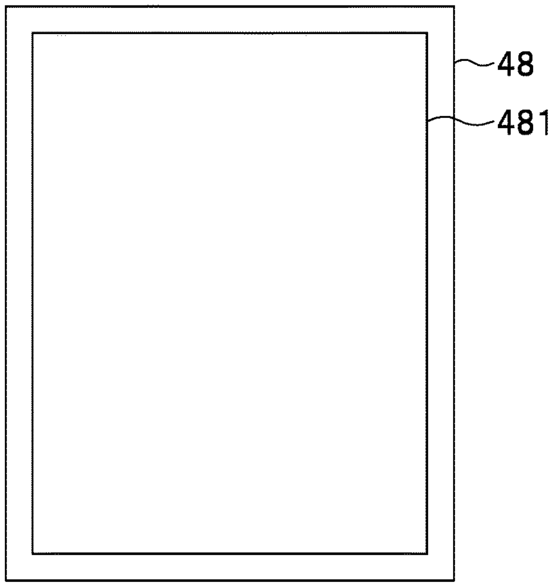
FIG. 12 is an explanatory diagram showing a patterned surface of an eighteenth dielectric layer of the multilayer stack shown in FIG. 1.

FIG. 11 shows a patterned surface of the eighteenth dielectric layer 48. The conductor layer 481 forming the shield 6 is formed on the patterned surface of the dielectric layer 48. The through holes 6T10, 7T10, and 8T10 formed in the seventeenth dielectric layer 47 are connected to the conductor layer 481.

The band-pass filter 1 according to the present embodiment is formed by stacking the first to eighteenth dielectric layers 31 to 48 such that the patterned surface of the first dielectric layer 31 also serves as the bottom surface 2A of the multilayer stack 2. A surface of the eighteenth dielectric layer 48 opposite to the patterned surface serves as the top surface 2B of the multilayer stack 2.

Figure 13:
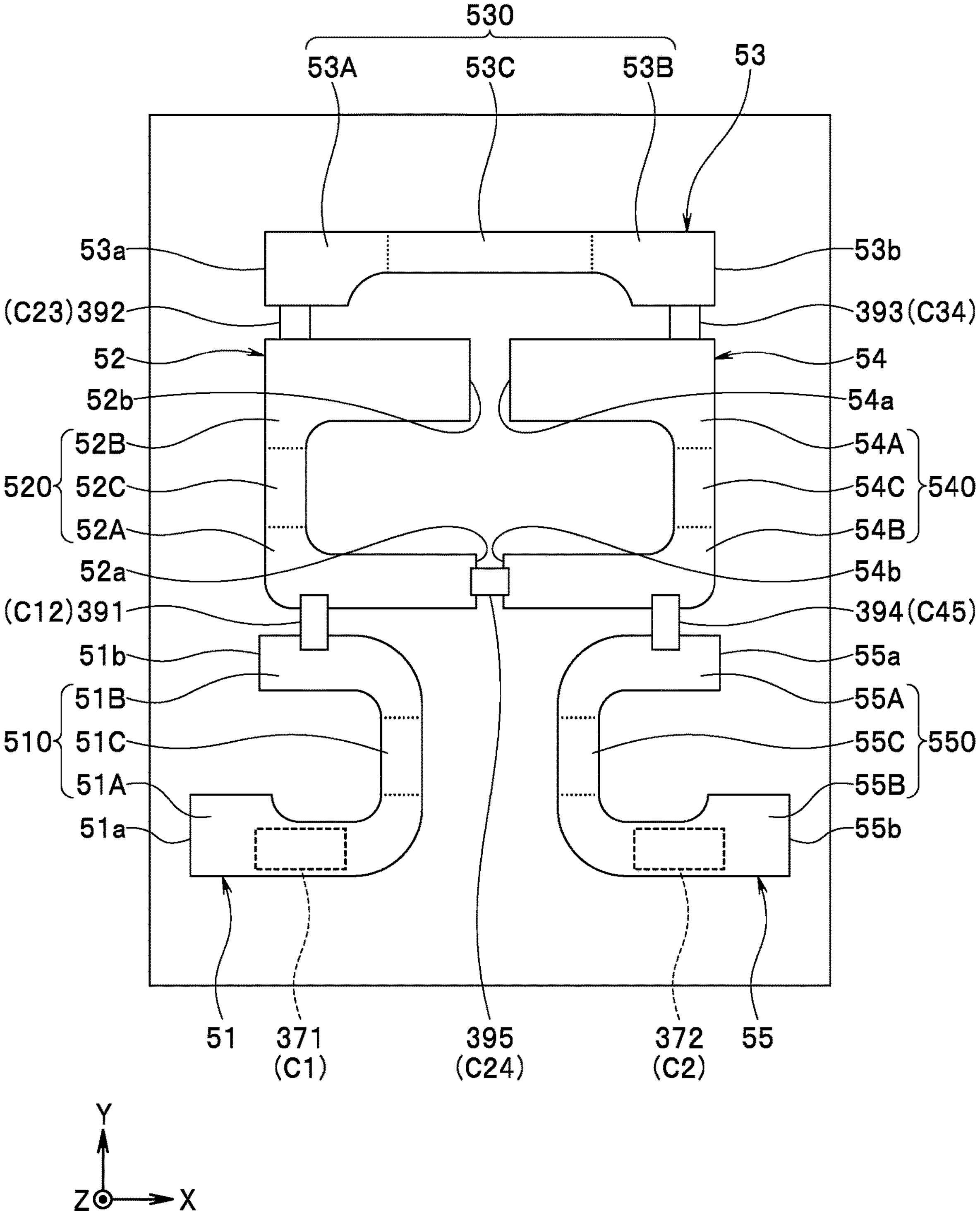
FIG. 13 is a plan view showing essential parts of the band-pass filter according to the first embodiment of the present invention.

Next, reference is made to FIG. 13 to describe the shapes and layout of the resonator conductor portions 510, 520, 530, 540, and 550. FIG. 13 is a plan view showing essential parts of the band-pass filter 1. The resonator conductor portions 510, 520, 530, 540, and 550 of the respective resonators 51 to 55 are located at the same position in the multilayer stack 2 with respect to the Z direction.

The resonator conductor portion 510 includes the first line part 51A and the second line part 51B located away from each other in the Y direction, and the third line part 51C connecting the first and second line parts 51A and 51B. In FIG. 13, the border between the first line part 51A and the third line part 51C and the border between the second line part 51B and the third line part 51C are indicated by respective dotted lines. The first to third line parts 51A to 51C extend to surround a space between the first line part 51A and the second line part 51B. Specifically, the entire resonator conductor portion 510, i.e., the first to third line parts 51A to 51C have a U shape surrounding the space when seen in the Z direction. A major part of each of the first and second line parts 51A and 51B extends along the X direction. The third line part 51C extends along the Y direction.

The first line part 51A has an end 51*a* located farthest from the third line part 51C in the longitudinal direction of the resonator conductor portion 510. The second line part 51B has an end 51*b* located farthest from the third line part 51C in the longitudinal direction of the resonator conductor portion 510.

As employed herein, a lateral dimension of each line part will be referred to as a width. The first line part 51A includes a first constant-width portion having a constant width. The second line part 51B includes a second constant-width portion having a constant width. The third line part 51C has a width smaller than that of each of the first and second constant-width portions. In particular, in the present embodiment, the first line part 51A includes, as the first constant-width portion, a portion including the end 51*a* and a portion located between the foregoing portion and the third line part 51C. The second constant-width portion includes the end 51*b*. The third line part 51C has a constant width regardless of the position in the longitudinal direction of the third line part 51C. The width of the third line part 51C is smaller than the maximum width of the first line part 51A and the maximum width of the second line part 51B, and is equal to the minimum width of the first line part 51A and the minimum width of the second line part 51B.

The resonator conductor portion 520 includes the first line part 52A and the second line part 52B located away from each other in the Y direction, and the third line part 52C connecting the first and second line parts 52A and 52B. In FIG. 13, the border between the first line part 52A and the third line part 52C and the border between the second line part 52B and the third line part 52C are indicated by respective dotted lines. The first to third line parts 52A to 52C extend to surround a space between the first line part 52A and the second line part 52B. Specifically, the entire resonator conductor portion 520, i.e., the first to third line parts 52A to 52C have a U shape surrounding the space when seen in the Z direction. A major part of each of the first and second line parts 52A and 52B extends along the X direction. The third line part 52C extends along the Y direction.

The first line part 52A has an end 52*a* located farthest from the third line part 52C in the longitudinal direction of the resonator conductor portion 520. The second line part 52B has an end 52*b* located farthest from the third line part 52C in the longitudinal direction of the resonator conductor portion 520.

The first line part 52A includes a first constant-width portion having a constant width. The second line part 52B includes a second constant-width portion having a constant width. The third line part 52C has a width smaller than that of each of the first and second constant-width portions. In particular, in the present embodiment, the first constant-width portion includes the end 52*a*. The second constant-width portion includes the end 52*b*. The third line part 52C has a constant width regardless of the position in the longitudinal direction of the third line part 52C. The width of the third line part 52C is smaller than the maximum width of the first line part 52A and the maximum width of the second line part 52B, and is equal to the minimum width of the first line part 52A and the minimum width of the second line part 52B.

The resonator conductor portion 530 includes the first line part 53A and the second line part 53B located away from each other in the X direction, and the third line part 53C connecting the first and second line parts 53A and 53B. In FIG. 13, the border between the first line part 53A and the third line part 53C and the border between the second line part 53B and the third line part 53C are indicated by respective dotted lines. The entire resonator conductor portion 530, i.e., the first to third line parts 53A to 53C extend along the X direction.

The first line part 53A has an end 53*a* located farthest from the third line part 53C in the longitudinal direction of the resonator conductor portion 530. The second line part

53B has an end 53*b* located farthest from the third line part 53C in the longitudinal direction of the resonator conductor portion 530.

The first line part 53A includes a first constant-width portion having a constant width. The second line part 53B includes a second constant-width portion having a constant width. The third line part 53C has a width smaller than that of each of the first and second constant-width portions. In particular, in the present embodiment, the first constant-width portion includes the end 53*a*. The second constant-width portion includes the end 53*b*. The third line part 53C has a constant width regardless of the position in the longitudinal direction of the third line part 53C. The width of the third line part 53C is smaller than the maximum width of the first line part 53A and the maximum width of the second line part 53B, and is equal to the minimum width of the first line part 53A and the minimum width of the second line part 53B.

The resonator conductor portion 520 and the resonator conductor portion 540 have shapes symmetrical about the YZ plane. The description of the first to third line parts 52A to 52C of the resonator conductor portion 520 applies to the first to third line parts 54A to 54C of the resonator conductor portion 540 if the resonator conductor portion 520, the first line part 52A, the second line part 52B, and the third line part 52C in the description are replaced with the resonator conductor portion 540, the first line part 54A, the second line part 54B, and the third line part 54C, respectively.

The first line part 54A has an end 54*a* located farthest from the third line part 54C in the longitudinal direction of the resonator conductor portion 540. The second line part 54B has an end 54*b* located farthest from the third line part 54C in the longitudinal direction of the resonator conductor portion 540.

The first line part 54A includes a first constant-width portion having a constant width. The second line part 54B includes a second constant-width portion having a constant width. The third line part 54C has a width smaller than that of each of the first and second constant-width portions. In particular, in the present embodiment, the first constant-width portion includes the end 54*a*. The second constant-width portion includes the end 54*b*. The third line part 54C has a constant width regardless of the position in the longitudinal direction of the third line part 54C. The width of the third line part 54C is smaller than the maximum width of the first line part 54A and the maximum width of the second line part 54B, and is equal to the minimum width of the first line part 54A and the minimum width of the second line part 54B.

The resonator conductor portion 510 and the resonator conductor portion 550 have shapes symmetrical about the YZ plane. The description of the first to third line parts 51A to 51C of the resonator conductor portion 510 applies to the first to third line parts 55A to 55C of the resonator conductor portion 550 if the resonator conductor portion 510, the first line part 51A, the second line part 51B, and the third line part 51C in the description are replaced with the resonator conductor portion 550, the first line part 55A, the second line part 55B, and the third line part 55C, respectively.

The first line part 55A has an end 55*a* located farthest from the third line part 55C in the longitudinal direction of the resonator conductor portion 550. The second line part 55B has an end 55*b* located farthest from the third line part 55C in the longitudinal direction of the resonator conductor portion 550.

The first line part 55A includes a first constant-width portion having a constant width. The second line part 55B includes a second constant-width portion having a constant width. The third line part 55C has a width smaller than that of each of the first and second constant-width portions. In particular, in the present embodiment, the first constant-width portion includes the end 55*a*. The second line part 55B includes, as the second constant-width portion, a portion including the end 55*b* and a portion located between the foregoing portion and the third line part 55C. The third line part 55C has a constant width regardless of the position in the longitudinal direction of the third line part 55C. The width of the third line part 55C is smaller than the maximum width of the first line part 55A and the maximum width of the second line part 55B, and is equal to the minimum width of the first line part 55A and the minimum width of the second line part 55B.

The resonator conductor portion 550 is located in front of the resonator conductor portion 510 in the X direction. The resonator conductor portions 520 and 540 are located in front of the resonator conductor portions 510 and 550 in the Y direction, respectively. The resonator conductor portion 530 is located in front of the resonator conductor portions 520 and 540 in the Y direction.

In the resonator conductor position 510, the second line part 51B is located in front of the first line part 51A in the Y direction. In the resonator conductor position 520, the second line part 52B is located in front of the first line part 52A in the Y direction. In the resonator conductor position 530, the second line part 53B is located in front of the first line part 53A in the X direction. In the resonator conductor position 540, the second line part 54B is located in front of the first line part 54A in the −Y direction. In the resonator conductor position 550, the second line part 55B is located in front of the first line part 55A in the −Y direction.

The second line part 51B of the resonator conductor portion 510 and the first line part 52A of the resonator conductor portion 520 are adjacent to each other and coupled by the capacitor C12. The second line part 52B of the resonator conductor portion 520 and the first line part 53A of the resonator conductor portion 530 are adjacent to each other and coupled by the capacitor C23. The second line part 53B of the resonator conductor portion 530 and the first line part 54A of the resonator conductor portion 540 are adjacent to each other and coupled by the capacitor C34. The second line part 54B of the resonator conductor portion 540 and the first line part 55A of the resonator conductor portion 550 are adjacent to each other and coupled by the capacitor C45.

The third line part 51C of the resonator conductor portion 510 and the third line part 55C of the resonator conductor portion 550 are adjacent to each other and both extend along the Y direction. The resonator 51 and the resonator 55 are thereby magnetically coupled to each other.

The first line part 52A of the resonator conductor portion 520 and the second line part 54B of the resonator conductor portion 540 are arranged with the ends 52*a* and 54*b* adjacent to each other in the X direction, and are coupled by the capacitor C24. The second line part 52B of the resonator conductor portion 520 and the first line part 54A of the resonator conductor portion 540 are arranged with the ends 52*b* and 54*a* adjacent to each other in the X direction.

Next, a correspondence between the components of the band-pass filter 1 and the components inside the multilayer stack 2 will be described with reference to FIGS. 2 to 13. The conductor layer 311 forming the first input/output port 3 is connected to the conductor layer 371 shown in FIG. 8 via the through holes 31T1, 32T1, and 33T1, the conductor layer 341, and the through hole 35T1. As shown in FIG. 13, the conductor layer 371 is opposed to the first line part 51A of the resonator conductor portion 510 with the dielectric layer 37 therebetween. The capacitor C1 shown in FIG. 2 is formed by the conductor layer 371, the resonator conductor portion 510, and the dielectric layer 37 therebetween. The capacitor C1 is connected to the first line part 51A of the resonator conductor portion 510 at a position away from the end 51*a* toward the third line part 51C in the longitudinal direction of the resonator conductor portion 510.

The conductor layer 312 forming the second input/output port 4 is connected to the conductor layer 372 shown in FIG. 8 via the through holes 31T2, 32T2, and 33T2, the conductor layer 342, and the through hole 35T2. As shown in FIG. 13, the conductor layer 372 is opposed to the second line part 55B of the resonator conductor portion 550 with the dielectric layer 37 therebetween. The capacitor C2 shown in FIG. 2 is formed by the conductor layer 372, the resonator conductor portion 550, and the dielectric layer 37 therebetween. The capacitor C2 is connected to the second line part 55B of the resonator conductor portion 550 at a position away from the end 55*b* toward the third line part 55C in the longitudinal direction of the resonator conductor portion 550.

As shown in FIG. 13, the conductor layer 391 is opposed to the second line part 51B of the resonator conductor portion 510 and the first line part 52A of the resonator conductor portion 520 with the dielectric layer 38 therebetween. The capacitor C12 shown in FIG. 2 is formed by the conductor layer 391, the resonator conductor portions 510 and 520, and the dielectric layer 38 therebetween. The capacitor C12 is connected to the second line part 51B of the resonator conductor portion 510 at a position away from the end 51*b* toward the third line part 51C in the longitudinal direction of the resonator conductor portion 510. The capacitor C12 is also connected to the first line part 52A of the resonator conductor portion 520 at a position away from the end 52*a* toward the third line part 52C in the longitudinal direction of the resonator conductor portion 520.

As shown in FIG. 13, the conductor layer 392 is located near the second line part 52B of the resonator conductor portion 520 and the first line part 53A of the resonator conductor portion 530 with the dielectric layer 38 therebetween. The capacitor C23 shown in FIG. 2 is formed by the conductor layer 392, the resonator conductor portions 520 and 530, and the dielectric layer 38 therebetween. The capacitor C23 is connected to the second line part 52B of the resonator conductor portion 520 at a position away from the end 52*b* toward the third line part 52C in the longitudinal direction of the resonator conductor portion 520. The capacitor C23 is also connected to the first line part 53A of the resonator conductor portion 530 at a position away from the end 53*a* toward the third line part 53C in the longitudinal direction of the resonator conductor portion 530.

As shown in FIG. 13, the conductor layer 393 is located near the second line part 53B of the resonator conductor portion 530 and the first line part 54A of the resonator conductor portion 540 with the dielectric layer 38 therebetween. The capacitor C34 shown in FIG. 2 is formed by the conductor layer 393, the resonator conductor portions 530 and 540, and the dielectric layer 38 therebetween. The capacitor C34 is connected to the second line part 53B of the resonator conductor portion 530 at a position away from the end 53*b* toward the third line part 53C in the longitudinal direction of the resonator conductor portion 530. The capacitor C34 is also connected to the first line part 54A of the resonator conductor portion 540 at a position away from the end 54*a* toward the third line part 54C in the longitudinal direction of the resonator conductor portion 540.

As shown in FIG. 13, the conductor layer 394 is opposed to the second line part 54B of the resonator conductor portion 540 and the first line part 55A of the resonator conductor portion 550 with the dielectric layer 38 therebetween. The capacitor C45 shown in FIG. 2 is formed by the conductor layer 394, the resonator conductor portions 540 and 550, and the dielectric layer 38 therebetween. The capacitor C45 is connected to the second line part 54B of the resonator conductor portion 540 at a position away from the end 54*b* toward the third line part 54C in the longitudinal direction of the resonator conductor portion 540. The capacitor C45 is also connected to the first line part 55A of the resonator conductor portion 550 at a position away from the end 55*a* toward the third line part 55C in the longitudinal direction of the resonator conductor portion 550.

As shown in FIG. 13, the conductor layer 395 is opposed to the first line part 52A of the resonator conductor portion 520 and the second line part 54B of the resonator conductor portion 540 with the dielectric layer 38 therebetween. The capacitor C24 shown in FIG. 2 is formed by the conductor layer 395, the resonator conductor portions 520 and 540, and the dielectric layer 38 therebetween.

Each of the four first through hole lines of the first partition 7 is formed by connecting through holes 7T2, 7T3, 7T4, 7T5, 7T7, 7T8, 7T9, and 7T10 in series in the Z direction. In the example shown in FIGS. 3 to 12, the first partition 7 extends to pass between the resonator conductor portion 510 and the resonator conductor portion 550 and is in contact with the conductor layer 321 and the conductor layer 481.

Each of the four second through hole lines of the second partition 8 is formed by connecting the through holes 8T2, 8T3, 8T4, 8T5, 8T7, 8T8, 8T9, and 8T10 in series in the Z direction. In the example shown in FIGS. 3 to 12, the second partition 8 extends through the space surrounded by the resonator conductor portion 520 and the resonator conductor portion 540, and is in contact with the conductor layer 321 and the conductor layer 481.

The shield 6 is formed by connecting the conductor layers 313 to 316, 321, and 481, and the through holes 6T1, 6T2, 6T3, 6T4, 6T5, 6T7, 6T8, 6T9, and 6T10.

The band-pass filter 1 according to the present embodiment is designed and configured to have a passband in 10- to 30-GHz quasi-millimeter wavebands or 30- to 300-GHz millimeter wavebands, for example.

The function and effects of the band-pass filter 1 according to the present embodiment will now be described. The band-pass filter 1 according to the present embodiment includes the open-ended resonators 51, 52, 53, 54, and 55. The resonators 51, 52, 53, 54, and 55 include the resonator conductor portions 510, 520, 530, 540, and 550, respectively. Except for the resonator conductor portion 530, the resonator conductor portions 510, 520, 540, and 550 are all specific resonator conductor portions corresponding to a "resonator conductor portion" of the present invention. Each of the resonator conductor portions 510, 520, 540, and 550 includes first to third line parts extending to surround a space between the first line part and the second line part. According to the present embodiment, the band-pass filter 1 can thus be miniaturized compared to the case where all the resonator conductor portions have a straight shape.

In the present embodiment, each of the resonator conductor portions 510, 520, 540, and 550 has a U shape when seen in the Z direction. However, the shapes of the resonator conductor portions 510, 520, 540, and 550 are not limited to U shapes and may be other shapes such as a C shape and an arch shape. For example, the first line part and the second line part do not need to be parallel to each other. Given resonator conductor portions of the same lengths, any of the foregoing shapes can reduce the area for laying out the resonator conductor portions compared to the case where the resonator conductor portions have a straight shape or an L shape.

In the present embodiment, the number of resonator conductor portions having a U shape is four. However, even if the number of resonator conductor portions having a U shape is one, the band-pass filter 1 can be miniaturized compared to the case where all the resonator conductor portions have a straight shape.

In the present embodiment, in any of the resonator conductor portions 510, 520, 530, 540, and 550, the third line part has a width smaller than that of each of the first constant-width portion of the first line part and the second constant-width portion of the second line part. The resonators 51 to 55 including such a third line part are all a kind of stepped impedance resonator (hereinafter, may be referred to as SIR). According to the present embodiment, configuring the resonators 51 to 55 as SIRs can reduce the lengths of the resonator conductor portions. According to the present embodiment, the band-pass filter 1 can thus also be miniaturized.

In the present embodiment, the resonator conductor portion 510 of the resonator 51 closest to the first input/output port 3 in circuit configuration and the resonator conductor portion 550 of the resonator 55 closest to the second input/output port 4 in circuit configuration are arranged along the X direction. The resonator conductor portions 520, 530, and 540 of the intermediate resonators provided between the resonators 51 and 55 in circuit configuration, i.e. the resonators 52 to 54, are located in front of the resonator conductor portions 510 and 550 in the Y direction. The X direction is a first direction orthogonal to the stacking direction of the plurality of dielectric layers in the multilayer stack 2. The Y direction is a second direction orthogonal to the stacking direction of the plurality of dielectric layers in the multilayer stack 2. According to the present embodiment, the resonator conductor portions 510, 520, 530, 540, and 550 are arranged in the first and second directions, whereby the band-pass filter 1 can be miniaturized compared to the case where all the resonator conductor portions are arranged in a line.

In the present embodiment, the third line part 51C of the resonator conductor portion 510 of the resonator 51 and the third line part 55C of the resonator conductor portion 550 of the resonator 55 are adjacent to each other and both extend along the Y direction in order to be parallel to each other. According to the present embodiment, the cross coupling between the resonators 51 and 55 can be easily achieved by arranging the resonator conductor portions 520, 530, and 540 in front of the resonator conductor portions 510 and 550 in the Y direction as described above.

In the present embodiment, the capacitors C1, C2, C12, C23, C34, and C45 are connected to the respective corresponding resonator conductor portions at positions away from both ends of the corresponding resonator conductor portions. The connection positions of the capacitors are preferably located at or near minimum voltage points in a higher order mode. This enables suppression of the higher order mode. The higher order mode may be the second order mode.

Next, an example of the characteristics of the band-pass filter 1 according to the present embodiment determined by simulation will be described. In the simulation, the frequency characteristics of the insertion loss and the return loss of the band-pass filter 1 were determined by using a model for the band-pass filter 1 according to the present embodiment. In the simulation, the band-pass filter 1 was designed so that the center frequency of the passband of the band-pass filter 1 was approximately 26 GHz.

Figure 14:
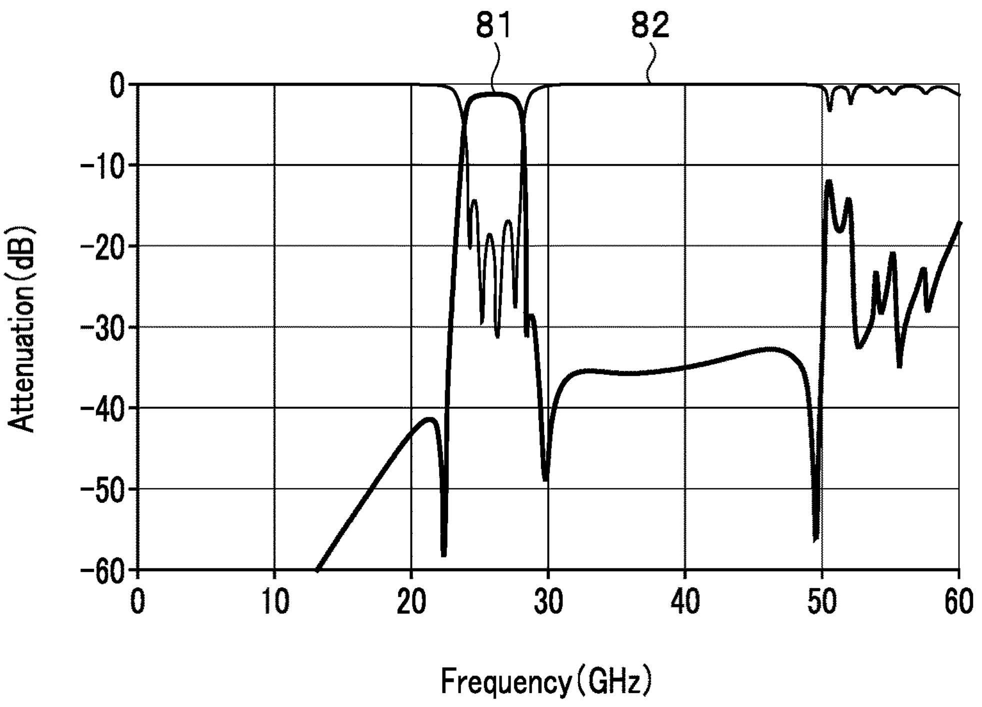
FIG. 14 is a characteristic chart showing an example of the frequency characteristics of insertion loss and return loss of the band-pass filter determined by simulation.
Figure 15:
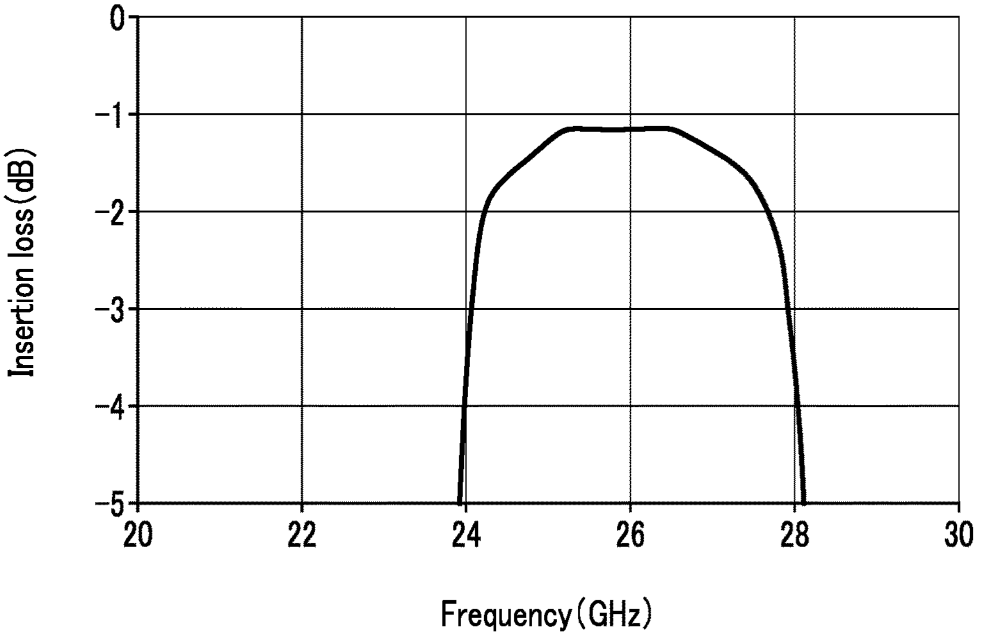
FIG. 15 is an enlarged characteristic chart showing a part of the frequency characteristics of the insertion loss shown in FIG. 14.
Figure 16:
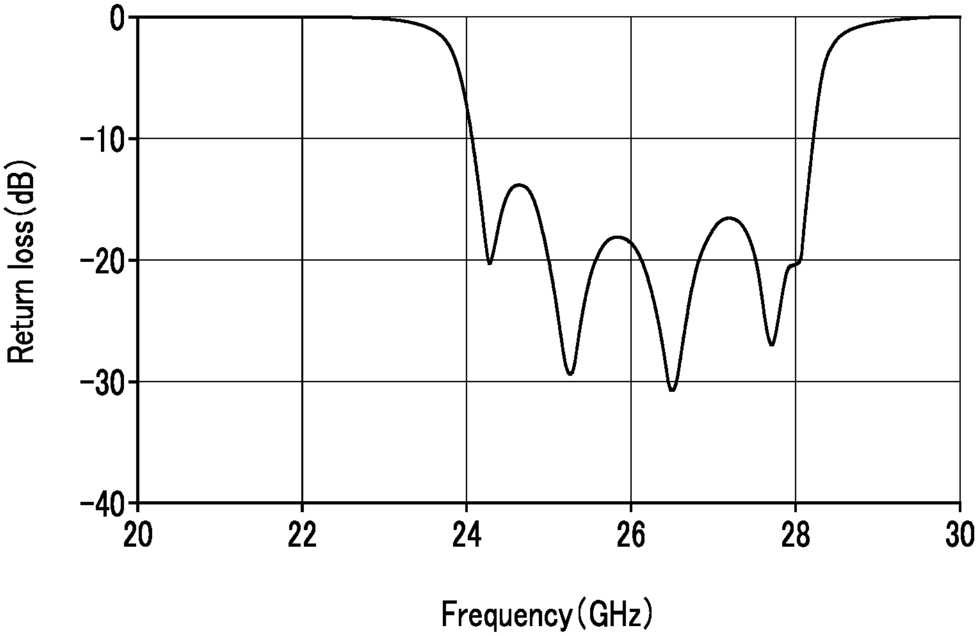
FIG. 16 is an enlarged characteristic chart showing a part of the frequency characteristics of the return loss shown in FIG. 14.

FIG. 14 is a characteristic chart showing an example of the frequency characteristics of the insertion loss and the return loss. FIG. 15 is an enlarged characteristic chart showing a part of the frequency characteristics of the insertion loss shown in FIG. 14. FIG. 16 is an enlarged characteristic chart showing a part of the frequency characteristics of the return loss shown in FIG. 14. In FIGS. 14 to 16, the horizontal axis represents the frequency. The vertical axis of FIG. 14 represents attenuation. The vertical axis of FIG. 15 represents insertion loss. The vertical axis of FIG. 16 represents return loss. In FIG. 14, the curve denoted by the reference numeral 81 represents the frequency characteristics of the insertion loss, and the curve denoted by the reference numeral 82 represents the frequency characteristics of the return loss.

Second Embodiment

Figure 17:
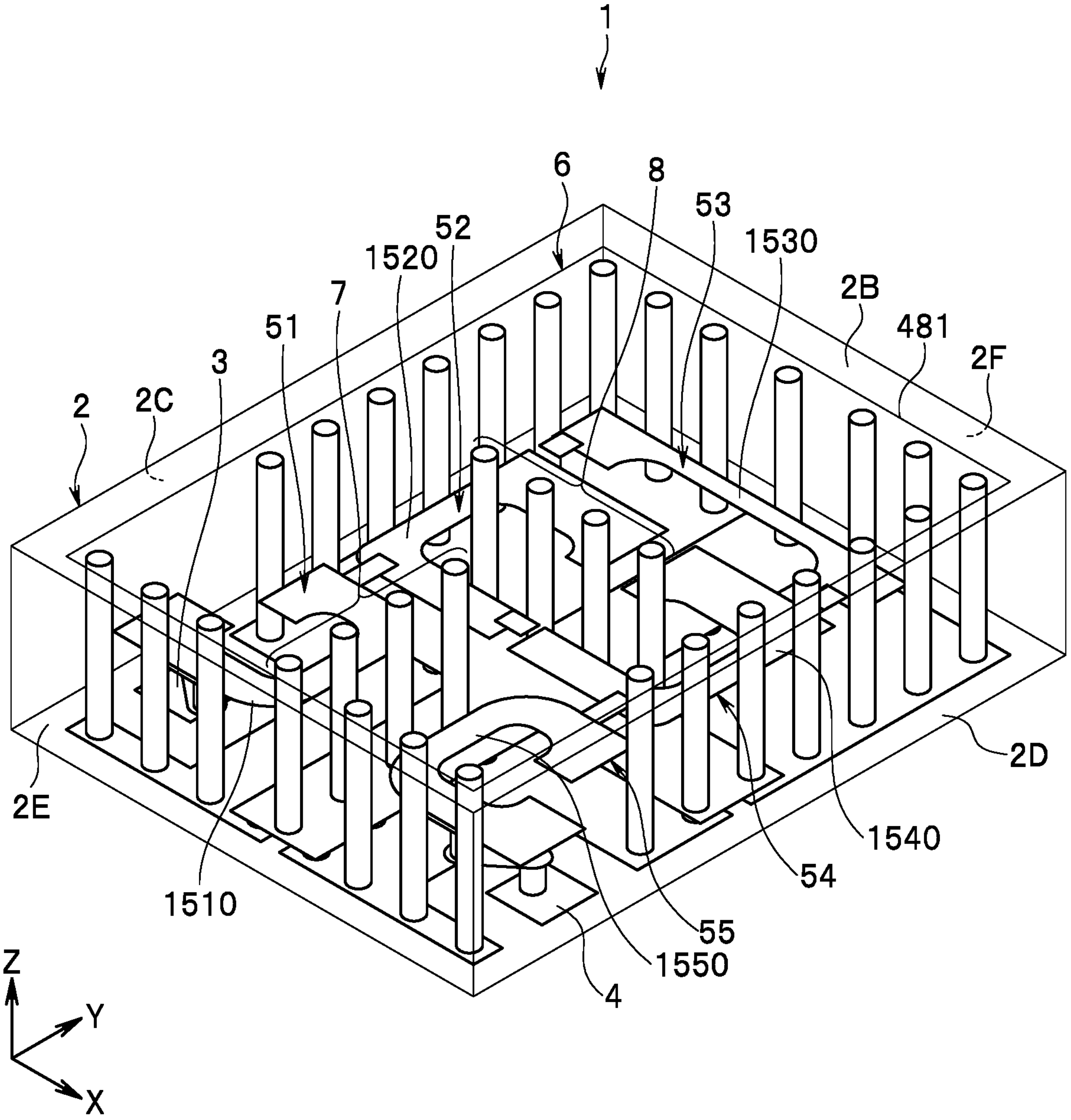
FIG. 17 is a perspective view showing the structure of a band-pass filter according to a second embodiment of the invention.
Figure 18:
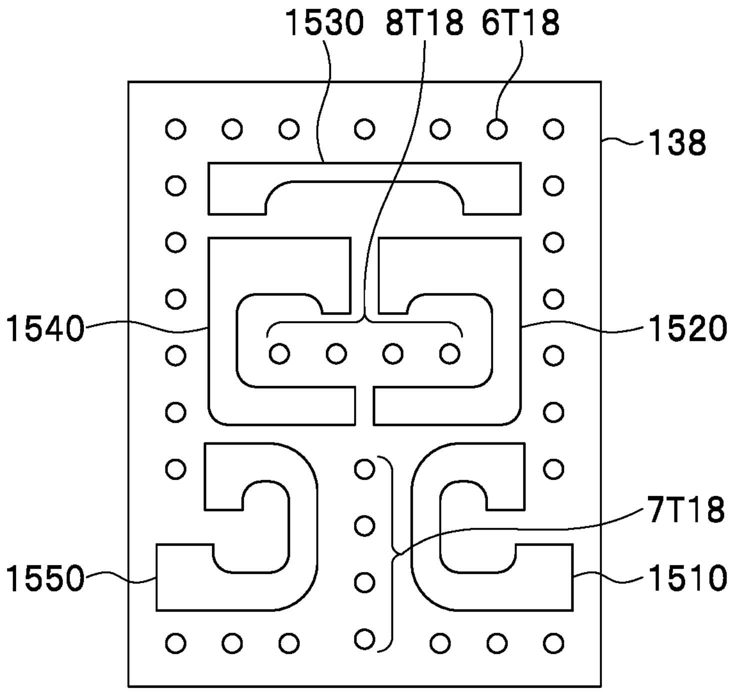
FIG. 18 is an explanatory diagram showing a patterned surface of an eighth dielectric layer of the second embodiment of the invention.
Figure 19:
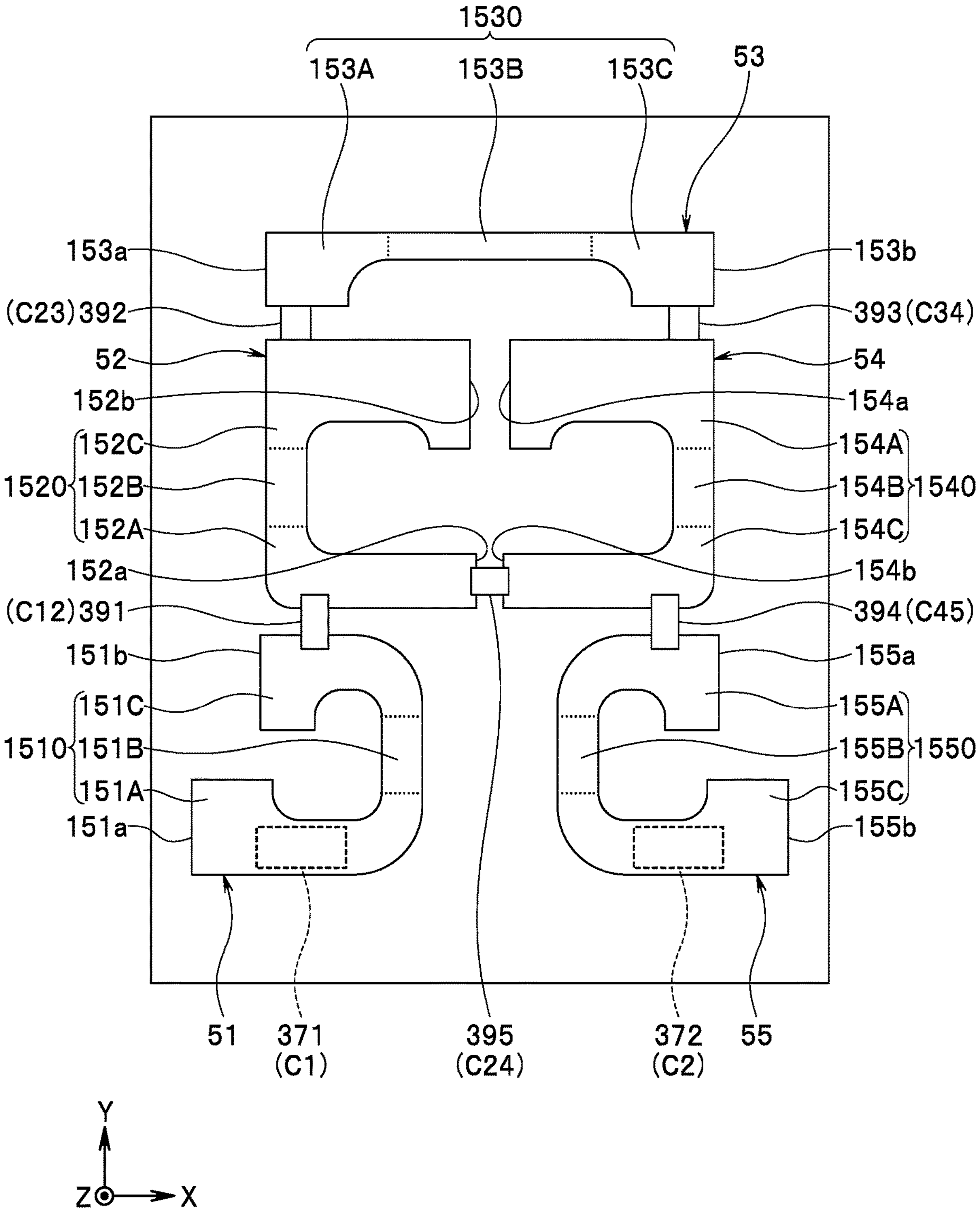
FIG. 19 is a plan view showing essential parts of the band-pass filter according to the second embodiment of the present invention.

Next, a second embodiment of the present invention will be described with reference to FIGS. 17 to 19. FIG. 17 is a perspective view showing the structure of a band-pass filter according to the present embodiment. FIG. 18 is an explanatory diagram showing a patterned surface of an eighth dielectric layer of the present embodiment. FIG. 19 is a plan view showing essential parts of the band-pass filter according to the present embodiment.

A band-pass filter 1 according to the present embodiment differs from the first embodiment in the following respects. In the present embodiment, the resonators 51, 52, 53, 54, and 55 of the band-pass filter 1 include resonator conductor portions 1510, 1520, 1530, 1540, and 1550 instead of the resonator conductor portions 510, 520, 530, 540, and 550 of the first embodiment, respectively. Each of the resonator conductor portions 1510, 1520, 1530, 1540, and 1550 extends in a direction orthogonal to the stacking direction of the plurality of dielectric layers, i.e., the Z direction.

Each of the resonator conductor portions 1510, 1520, 1530, 1540, and 1550 is opened at both ends. Each of the resonator conductor portions 1510, 1520, 1530, 1540 and 1550 has a length of one half or nearly one half the wavelength corresponding to the center frequency of the passband of the band-pass filter 1.

Each of the resonator conductor portions 1510, 1520, 1530, 1540, and 1550 includes a first line part and a second line part located away from each other in a direction orthogonal to the Z direction, and a third line part connecting the first and second line parts.

The first, second, and third line parts of the resonator conductor portion 1510 will hereinafter be denoted by the reference numerals 151A, 151B, and 151C, respectively. The first, second, and third line parts of the resonator conductor portion 1520 will be denoted by the reference numerals 152A, 152B, and 152C, respectively. The first, second, and third line parts of the resonator conductor portion 1530 will be denoted by the reference numerals 153A, 153B, and 153C, respectively. The first, second, and third line parts of the resonator conductor portion 1540 will be denoted by the reference numerals 154A, 154B, and 154C, respectively. The first, second, and third line parts of the resonator conductor portion 1550 will be denoted by the reference numerals 155A, 155B, and 155C, respectively.

In the present embodiment, the multilayer stack 2 of the band-pass filter 1 includes an eighth dielectric layer 138 instead of the eighth dielectric layer 38 of the first embodiment. As shown in FIG. 18, the resonator conductor portions 1510, 1520, 1530, 1540, and 1550 each formed of a conductor line are formed on the patterned surface of the dielectric layer 138.

In the dielectric layer 138, a plurality of through holes 6T18 forming the shield 6, four through holes 7T18 forming the first partition 7, and four through holes 8T18 forming the second partition 8 are formed. The plurality of through holes 6T18 are arranged around the resonator conductor portions 1510, 1520, 1530, 1540, and 1550. The four through holes 7T18 are located between the resonator conductor portion 1510 and the resonator conductor portion 1550. The four through holes 8T18 are arranged in a space surrounded by the resonator conductor portions 1520 and 1540.

The relationship between the resonator conductor portions 1510, 1520, 1530, 1540, and 1550, the through holes 6T18, 7T18, and 8T18, and the other components in the multilayer stack 2 is the same as that between the resonator conductor portions 510, 520, 530, 540, and 550, the through holes 6T8, 7T8, and 8T8, and the other components in the multilayer stack 2 of the first embodiment.

The layout of all the line parts included in the resonator conductor portions 1510, 1520, 1530, 1540, and 1550 is basically the same as that of all the line parts included in the resonator conductor portions 510, 520, 530, 540, and 550 of the first embodiment.

In the present embodiment, the entire resonator conductor portion 1510, i.e., the first to third line parts 151A to 151C have a C shape surrounding a space between the first line part 151A and the second line part 151B when seen in the Z direction. The first line part 151A has an end 151*a* located farthest from the third line part 151C in the longitudinal direction of the resonator conductor portion 1510. The second line part 151B has an end 151*b* located farthest from the third line part 151C in the longitudinal direction of the resonator conductor portion 1510.

The entire resonator conductor portion 1520, i.e., the first to third line parts 152A to 152C have a C shape surrounding a space between the first line part 152A and the second line part 152B when seen in the Z direction. The first line part 152A has an end 152*a* located farthest from the third line part 152C in the longitudinal direction of the resonator conductor portion 1520. The second line part 152B has an end 152*b* located farthest from the third line part 152C in the longitudinal direction of the resonator conductor portion 1520.

The entire resonator conductor portion 1530, i.e., the first to third line parts 153A to 153C extend along the X direction. The first line part 153A has an end 153*a* located farthest from the third line part 153C in the longitudinal direction of the resonator conductor portion 1530. The second line part 153B has an end 153*b* located farthest from the third line part 153C in the longitudinal direction of the resonator conductor portion 1530.

The entire resonator conductor portion 1540, i.e., the first to third line parts 154A to 154C have a C shape surrounding a space between the first line part 154A and the second line part 154B when seen in the Z direction. The first line part 154A has an end 154*a* located farthest from the third line part 154C in the longitudinal direction of the resonator conductor portion 1540. The second line part 154B has an end 154*b* located farthest from the third line part 154C in the longitudinal direction of the resonator conductor portion 1540.

The entire resonator conductor portion 1550, i.e., the first to third line parts 155A to 155C have a C shape surrounding a space between the first line part 155A and the second line part 155B when seen in the Z direction. The first line part 155A has an end 155*a* located farthest from the third line part 155C in the longitudinal direction of the resonator conductor portion 1550. The second line part 155B has an end 155*b* located farthest from the third line part 155C in the longitudinal direction of the resonator conductor portion 1550.

In any of the resonator conductor portions 1510, 1520, 1530, 1540, and 1550, the first line part includes a first constant-width portion having a constant width, and the second line part includes a second constant-width portion having a constant width. The third line part has a width smaller than that of each of the first and second constant-width portions.

The configuration, function and effects of the present embodiment are otherwise the same as those of the first embodiment.

The present invention is not limited to the foregoing embodiments, and various modifications may be made thereto. For example, the number and configuration of resonators are not limited to those shown in the embodiments, and any number and configuration of resonators may be employed as long as the scope of the claims is satisfied. The number of resonators may be three, four, or six or more.

Obviously, many modifications and variations of the present invention are possible in the light of the above teachings. Thus, it is to be understood that, within the scope of the appended claims and equivalents thereof, the invention may be practiced in other embodiments than the foregoing most preferable embodiments.

What is claimed is:

1. A band-pass filter comprising:

a first input/output port;

a second input/output port;

a plurality of resonators that are provided between the first input/output port and the second input/output port in circuit configuration and are configured so that two resonators adjacent to each other in circuit configuration are electromagnetically coupled to each other; and a multilayer stack configured to integrate the first input/output port, the second input/output port, and the plurality of resonators, wherein:

the multilayer stack includes a plurality of stacked dielectric layers;

each of the resonators is an open-ended resonator formed of a conductor line in the multilayer stack;

at least one of the resonators includes a resonator conductor portion including a first line part and a second line part located away from each other in a direction orthogonal to a stacking direction of the plurality of dielectric layers, and a third line part connecting the first line part and the second line part;

the first to third line parts extend to surround a space between the first line part and the second line part;

the resonators include a first resonator, a second resonator, and at least one intermediate resonator provided between the first resonator and the second resonator in circuit configuration;

the first and second resonators each include the resonator conductor portion; and the third line part of the resonator conductor portion of the first resonator and the third line part of the resonator conductor portion of the second resonator are adjacent to each other and both extend in the same direction orthogonal to the stacking direction.

2. The band-pass filter according to claim 1, wherein the first resonator is closest to the first input/output port in circuit configuration, and the second resonator is closest to the second input/output port in circuit configuration.

3. The band-pass filter according to claim 1, wherein the third line part of the resonator conductor portion of the first resonator and the third line part of the resonator conductor portion of the second resonator are adjacent to each other with no other resonator interposed therebetween.

4. The band-pass filter according to claim 2, wherein:

the at least one intermediate resonator includes a plurality of intermediate resonators; and at least one of the plurality of intermediate resonators includes the resonator conductor portion.

5. The band-pass filter according to claim 2, wherein:

the at least one intermediate resonator includes a third resonator, a fourth resonator, and a fifth resonator;

the fourth resonator is provided between the third resonator and the fifth resonator in circuit configuration; and the third and fifth resonators each include the resonator conductor portion.

6. The band-pass filter according to claim 1, further comprising at least one capacitor, wherein:

each of the first and second line parts has an end located farthest from the third line part in a longitudinal direction of the resonator conductor portion; and the at least one capacitor is connected to the resonator conductor portion at a position away from the end towards the third line part in the longitudinal direction.

7. The band-pass filter according to claim 1, wherein the first line part includes a first constant-width portion having a constant lateral dimension;

the second line part includes a second constant-width portion having a constant lateral dimension; and the third line part has a lateral dimension smaller than a lateral dimension of each of the first and second constant-width portions.

8. The band-pass filter according to claim 1, wherein the first and second resonators are magnetically coupled to each other.

* * * * *